(12) United States Patent
Trias

(10) Patent No.: US 9,087,307 B2
(45) Date of Patent: Jul. 21, 2015

(54) LONG TAIL MONETIZATION PROCEDURE

(76) Inventor: Antonio Trias, Barcelona (ES)

(*) Notice: Subject to any disclaimer, the term of this patent is extended or adjusted under 35 U.S.C. 154(b) by 361 days.

(21) Appl. No.: 13/561,379

(22) Filed: Jul. 30, 2012

(65) Prior Publication Data

US 2013/0031108 A1 Jan. 31, 2013

Related U.S. Application Data

(60) Provisional application No. 61/512,657, filed on Jul. 28, 2011.

(51) Int. Cl.
*G06F 17/30* (2006.01)
*G06Q 10/04* (2012.01)
*G06Q 30/02* (2012.01)

(52) U.S. Cl.
CPC .......... *G06Q 10/04* (2013.01); *G06F 17/30303* (2013.01); *G06F 17/30598* (2013.01); *G06Q 30/02* (2013.01)

(58) Field of Classification Search
CPC ............... G06F 17/30817; G06F 17/30867; G06F 17/3069; G06F 17/30702; G06F 17/30708; G06F 17/3053; G06F 17/30705; G06F 17/30861; G06F 17/30598; G06F 17/3089; G06F 19/12; G06F 19/24; G06F 17/2818
See application file for complete search history.

(56) References Cited

U.S. PATENT DOCUMENTS

| | | | |
|---|---|---|---|
| 6,115,718 A | 9/2000 | Huberman et al. | |
| 6,223,205 B1 | 4/2001 | Harchol-Balter et al. | |
| 7,529,741 B2 | 5/2009 | Aravamudan et al. | |
| 7,647,332 B2 | 1/2010 | Van Flandern et al. | |
| 7,657,526 B2 | 2/2010 | Aravamudan et al. | |
| 7,707,215 B1 | 4/2010 | Huberman et al. | |
| 7,720,933 B2 | 5/2010 | Gordon et al. | |
| 7,734,641 B2 | 6/2010 | Kanigsberg et al. | |
| 7,774,341 B2 | 8/2010 | Aravamudan et al. | |
| 7,792,815 B2 | 9/2010 | Aravamudan et al. | |
| 7,885,904 B2 | 2/2011 | Aravamudan et al. | |
| 7,949,627 B2 | 5/2011 | Aravamudan et al. | |
| 8,073,682 B2 * | 12/2011 | Stefik | 704/9 |
| 8,166,039 B1 * | 4/2012 | Haveliwala | 707/741 |
| 2007/0294733 A1 | 12/2007 | Aaron et al. | |

(Continued)

OTHER PUBLICATIONS

Liliana Ardissono et al., "User Modeling and Recommendation Techniques for Personalized Electronic Program Guides", pp. 1-27, Aug. 15, 2012.

(Continued)

*Primary Examiner* — Michelle Owyang
(74) *Attorney, Agent, or Firm* — Gibb & Riley, LLC

(57) ABSTRACT

A system and method for constructively providing a monetization procedure for a long tail demand curve of market goods, services or contents through a channel such as the Internet or mobile devices, for which there exists a source providing economic scoring (sales, downloads, streaming hours, etc.). Using only the scorings for a few reference items and a quantitative concept of similarity between the items, embodiments provide a procedure that constructively distributes the score from the reference items to the non-ranked ones, yielding the full scoring curve adjusted to a long tail law (power law). In order to build scores for non-ranked items, the method recursively defines relative preferences between items based on their similarity, thus constructing a utility-like function. The preferences are then used within an iterative tournament strategy between the items.

19 Claims, 16 Drawing Sheets

(56) References Cited

U.S. PATENT DOCUMENTS

| | | | |
|---|---|---|---|
| 2008/0250009 A1* | 10/2008 | Xie et al. | 707/5 |
| 2009/0049082 A1* | 2/2009 | Slaney et al. | 707/103 R |
| 2010/0121857 A1 | 5/2010 | Elmore et al. | |
| 2010/0235362 A1* | 9/2010 | Cormode et al. | 707/748 |
| 2010/0268661 A1 | 10/2010 | Levy et al. | |
| 2010/0332595 A1 | 12/2010 | Fullagar et al. | |
| 2011/0295846 A1* | 12/2011 | Priyadarshan et al. | 707/723 |
| 2012/0271825 A1* | 10/2012 | Garthwaite et al. | 707/736 |
| 2013/0060766 A1* | 3/2013 | Lin et al. | 707/723 |

OTHER PUBLICATIONS

Yehuda Korening, "Factorization Meets the Neighborhood: a Multifaceted Collaborative Filter Model", KDD'08, Aug. 24-27, 2008, Las Vegas, Nevada, USA, pp. 1-9.

The Long Tail is Longer than You Think: The Surprisingly Large Extent of Online Sales by Small volume Sellers Joe Bailey, Gordon Gao, Wolfgang Jank,Mingfeng Lin, Hank Lucas, and Siva Viswanathan the Robert H. Smith School of Business University of Maryland May 12, 2008, pp. 1-8.

Gal Oestrieicher-Singer et al. "Recommendation Networks and the Long Tail of Electronic Commerce", pp. 1-38, Aug. 15, 2012.

Is Tom Cruise Threatened? Using Net ix Prize Data to Examine the Long Tail of Electronic Commerce Tom F. TanSerguei Netessine Operations and Information Management, Wharton Business School, University of Pennsylvania, Philadelphia, Pennsylvania 19104 fangyun@wharton.upenn.edu, netessine@wharton.upenn.edu, pp. 1-37, Aug. 15, 2012.

http:/www.wired.com/wired/archive/12.0/tail_pr.html, "Wired 12.10: The Long Tail", Jul. 26, 2012, pp. 1-7.

John von Neumann et al., "Theory of Games and Economic Behavior", Princeton University Press, 2004. pp. 1-27.

\* cited by examiner

LONG TAIL MONETIZATION PROCEDURE

CROSS REFERENCES TO RELATED APPLICATION

The present application claims the benefit under 35 U.S.C. §120 as a non-provisional of presently pending U.S. Patent Application Ser. No. 61/512,657 entitled "LONG TAIL MONETIZATION PROCEDURE", filed on Jul. 28, 2011, the entire teachings of which are incorporated herein by reference.

BACKGROUND

1. Field of the Invention

The present invention relates to the problem of modeling the scoring or demand curves for large sets of objects (products or downloads), in cases where the demand behavior is known to exhibit the Long Tail phenomenon. This is particularly relevant in the context of Internet-based commerce, where various businesses have been experimentally proven to behave that way. In particular, the method concentrates on the problem of predicting the full scoring curve using incomplete information. The method works with the scoring values of just a few (reference) objects, plus some quantified measure of similarity between all the objects.

2. Description of the Background

The concept of a "long tail" distribution has been commonly used in diverse fields, like statistics and physics, to refer to phenomena in which the distribution of a magnitude is shown to exhibit a power-law decay as the magnitude approaches very large values. For the purposes of this discussion, power-law decaying distributions are special mainly because of the much slower rate of decay as compared with Gaussian distributions, for example. However, power laws are also special because they show scale-free behavior, meaning that the shape of the curve can be easily rescaled to fit a common (i.e. "universal") power law of the type $x^\alpha$. In other words, the exponent $\alpha$ is all that characterizes the distribution curve for large x.

In the context of the new Internet-based economy, the popularization of the concept of "The Long Tail" is attributed to Chris Anderson. In his first article in Wired Magazine (Anderson, "The Long Tail", Wired, Issue 12.10, October 2004) and then later in his book (Anderson, "The Long Tail: Why the Future of Business Is Selling Less of More" (New York: Hyperion Press 2006)), Anderson shows how, for most of the new big Internet retailers, the demand exhibits a long tail behavior. Note that this actually concerns the demand curve for the universe of items on sale, when these are ordered by sales rank. Although it may be tempting to think of it as a "probability distribution" for the number of sales, this could be misleading and lead to wrong analyses. Notwithstanding a few criticisms (notably, Tan et al., "Is Tom Cruise Threatened? Using Netflix Prize Data to Examine the Long Tail of Electronic Commerce", July 2009, Wharton, University of Pennsylvania, available at http://opim.wharton.upenn.edu/~netessin/TanNetessine.pdf), it is widely recognized that the tenets of the theory are experimentally confirmed both for large and small retailers (see Bailey et al., "The Long Tail is Longer than You Think: The Surprisingly Large Extent of Online Sales by Small Volume Sellers, May 13, 2008, available at SSRN: http://ssrn.com/abstract=1132723).

The mechanisms by which the long tail behavior appears are well known: the new era of on-line retail allows businesses to enlarge their product catalog endlessly, because shelf-space costs are nearly zero. Once consumers are offered limitless variety, it is to be expected that the demand curves extend their shape to more and more items. However, the non-obvious aspect of the theory is that the particular shape of the tail is a power-law tail (see FIG. 1). The implications for business models are then clear: an internet business can now monetize the tail of the long tail distribution of the demand. Moreover, the demand in the whole tail can actually add up to a percentage of sales that rivals the head of the curve (see FIG. 2). Today, it is evident that the most successful Internet businesses have been those with the vision and skills to monetize the long tail of the demand (see, for instance, Levy, "In the Plex: How Google thinks, works, and shapes our lives" (Simon & Schuster 2011)).

Therefore, it has become quite important to accurately model and predict the long tail part of a demand curve, in order to optimize the economic value extracted from it. Such modeling enables better quantification of targeted marketing or recommendation system efforts. Although the long tail framework is quite recent, many publications and innovations make use of it in one way or another.

U.S. Patent App. Pub. No. 2007/0294733 by Aaron et al. describes methods for facilitating content-based selection in long tail business models, based on the position of the requested item on a content demand curve.

Another area of interest is that of destroying or minimizing any remaining barriers to a full long tail business; in other words, ensure that the shelving costs remain close to zero. For instance, in U.S. Pat. No. 6,223,205 granted to Harchol-Balter et al., a method is disclosed for assigning tasks in a distributed server system, intended to optimize requests for service in the scenario of heavy tailed distributions. U.S. Pat. No. 7,707,215 granted to Huberman et al. describes a pari-mutuel content provisioning method for peer-to-peer networks, intended to provide a wide diversity of content offerings while responding adaptively to customer demand. Files are served and paid for through a pari-mutuel market (similar to that commonly used for betting in horse races), and it is shown that the system achieves an equilibrium with a long tail in the distribution of content offerings, guaranteeing the real-time provision of any content regardless of its popularity.

U.S. Pat. No. 7,720,933 granted to Gordon et al. discloses an end-to-end data transfer method in which a multi-tiered control system combines the best features of a centralized system and peer-to-peer systems in order to minimize the problems associated with serving "obscure" content (the far end of the long tail distribution, i.e. non-popular or less sold contents). U.S. Patent App. Pub. No. 2010/0332595 by Fullagar et al. also deals with the problems related to handling long tail content in a delivery network. It discloses a method consisting of a hierarchy of servers designed to cache a universe of items with a long tailed demand curve.

U.S. Pat. No. 7,647,332 to Van Flandern et al. shows methods to deal with the problem of content discovery in the context of abundant long tail commerce, in the form of an aggregating interface.

A different set of problems includes those related to the prediction of the scoring of particular items, and the related problem of item similarity. Targeted marketing campaigns and recommendation systems make use of these two key concepts; therefore, they are crucial for the successful exploitation of long tail markets. See for instance, Ardissono et al., "User Modeling and Recommendation Techniques for Personalized Electronic Program Guides", pp. 3-26 in: Personalized Digital Television, Human-Computer Interaction Series Vol. 6, Eds. Ardissono et al., Springer, Netherlands, 2004. U.S. Pat. No. 6,115,718 granted to Huberman et al. discloses a method for predicting document access in a collection of linked documents featuring link probabilities, which may be interpreted as similarities in other long tail contexts. The method works by simulating a "law of surfing", and achieves a scoring index that predicts the likelihood of access. U.S. Pat. No. 7,734,641 granted to Kanigsberg et al. discloses a system for recommendations, which is primarily based on the interpretation (using the semantic content of natural language) of user's searches, but also uses the popularity index of the items.

In U.S. Pat. Nos. 7,949,627; 7,885,904; 7,792,815; 7,774,341; 7,657,526; and 7,529,741, all granted to Aravamudan et al., several methods are disclosed to score the contents for each particular user in order to achieve better customized recommendations.

U.S. Patent Appl. Pub. No. 2010/0268661 by Levy et al. discloses a method for building a recommendation system using two supervised learning techniques: categorical training, where recommended items are based upon similar categories; and similar-to related training, where similar items are used to find related items.

In "Factorization meets the neighborhood: a multifaceted collaborative filtering model", Proc. 14th ACM SIGKDD Int. Conf. on Knowledge Discovery and Data Mining (KDD'08), pp. 426-434, 2008, Koren advances the art of recommendation systems by merging the two most common approaches for exploiting collaborative filtering, namely factorization (i.e. profiling of users and products) and modeling of "neighborhoods" based on similarity. The author, who tested his methods on the dataset that Netflix™ made available in 2006, recognizes the power of neighborhood methods, as they work only on items and do not need to compare users to items.

A different issue of concern here is the construction of a demand curve a priori, or the related problem of predicting the relative score of a new item in the universe. The method disclosed herein addresses these two issues. One source of inspiration comes from the well-known utility function theorem described in Von Neumann et al., "Theory of Games and Economic Behavior", Third Ed. (Princeton University Press, 1953), which asserts that there exists a function that is able to reproduce the outcomes of a set of pair-wise preferences between the items in the set. The other comes from the Elo rating system for ranking chess players, a process by which the relative skills between players end up producing a scoring curve that approximates the expected distribution (a Gaussian in this case). See Elo, "The Rating of Chessplayers, Past and Present" (Arco, 1978; Ishi Press reprint, 2008) and Harkness, "Official Chess Handbook" (McKay, 1973). Invented by the Hungarian-born American physicist and chess master Arpad Elo, the Elo method works by exchanging rating values between each two players according to the results of their match, using a precise formula designed to reproduce a Gaussian distribution. After a sufficiently large number of tournaments, the emergent curve of Elo ratings does reproduce the expected distribution. The Elo system was invented as an improved chess rating system, but today it is also used in many other multiplayer games and competitions. Even if statistical tests have shown that chess performance is not exactly normally distributed, the method is used with modified formulas, but still referred to as the Elo system.

There are not many studies directly related to the a priori modeling of the demand curve. U.S. Patent Appl. Pub. No. 2010/0121857 by Elmore et al. discloses an Internet-based method for ranking artists using a popularity profile. It is relevant here because it is a method that turns dispersed information about preferences in popularity into a unified score that allows a ranking of all artists. In "Recommendation Networks and the Long Tail of Electronic Commerce", Sep. 1, 2010, available at SSRN: http://ssrn.com/abstract=1324064, Oestreicher-Singer et al. describe an approach to the study of the long tail demand curve from an interesting perspective: they analyze the effect of an existing system (recommendation networks) on the flattening of the curve. Alternatively, in "Open Mobile Platforms: Modeling the Long-Tail of Application Usage", Fourth International Conference on Internet and Web Applications and Services, IEEE, pp. 112-118, May 2009, Verkasalo studies the modeling of the long tail demand curve for smart-phone applications, although from an empirical point of view.

SUMMARY

A main objective of this monetization procedure for long tail businesses is to provide a constructive method for obtaining the full distribution of scores, using only partial information about a few reference items (for which the score is known) and a quantitative method to express similarity between items. In other words, the method disclosed herein achieves an a priori modeling of the long-tailed demand curves using only partial information.

The system and method can constructively provide a monetization procedure for a long tail demand curve of market goods, services, or contents through a channel such as the Internet or mobile devices, for which there exists a source providing economic scoring (sales, downloads, streaming hours, etc.). Using only the scorings for a few reference items and a quantitative concept of similarity between the items, the embodiments herein provide a procedure that constructively distributes the score from the reference items to the non-ranked ones, yielding the full scoring curve adjusted to a long tail law (power law). In order to build scores for non-ranked items, the method recursively defines relative preferences between items based on their similarity, thus constructing a utility-like function. The preferences are then used within an iterative tournament strategy between the items, inspired in the Elo method employed in the rating of professional chess players. This score can then be used to determine a recommendation strategy for content delivery that will have similarity as the base factor, yet allow improvement and optimization of the monetization of the tail of the long tail distribution in a more controlled manner. The similarity or preference-based measure underlying the invention as a base improves the pleasing of the receptor of the content.

DETAILED DESCRIPTION OF EXEMPLARY EMBODIMENTS

Figure 1:
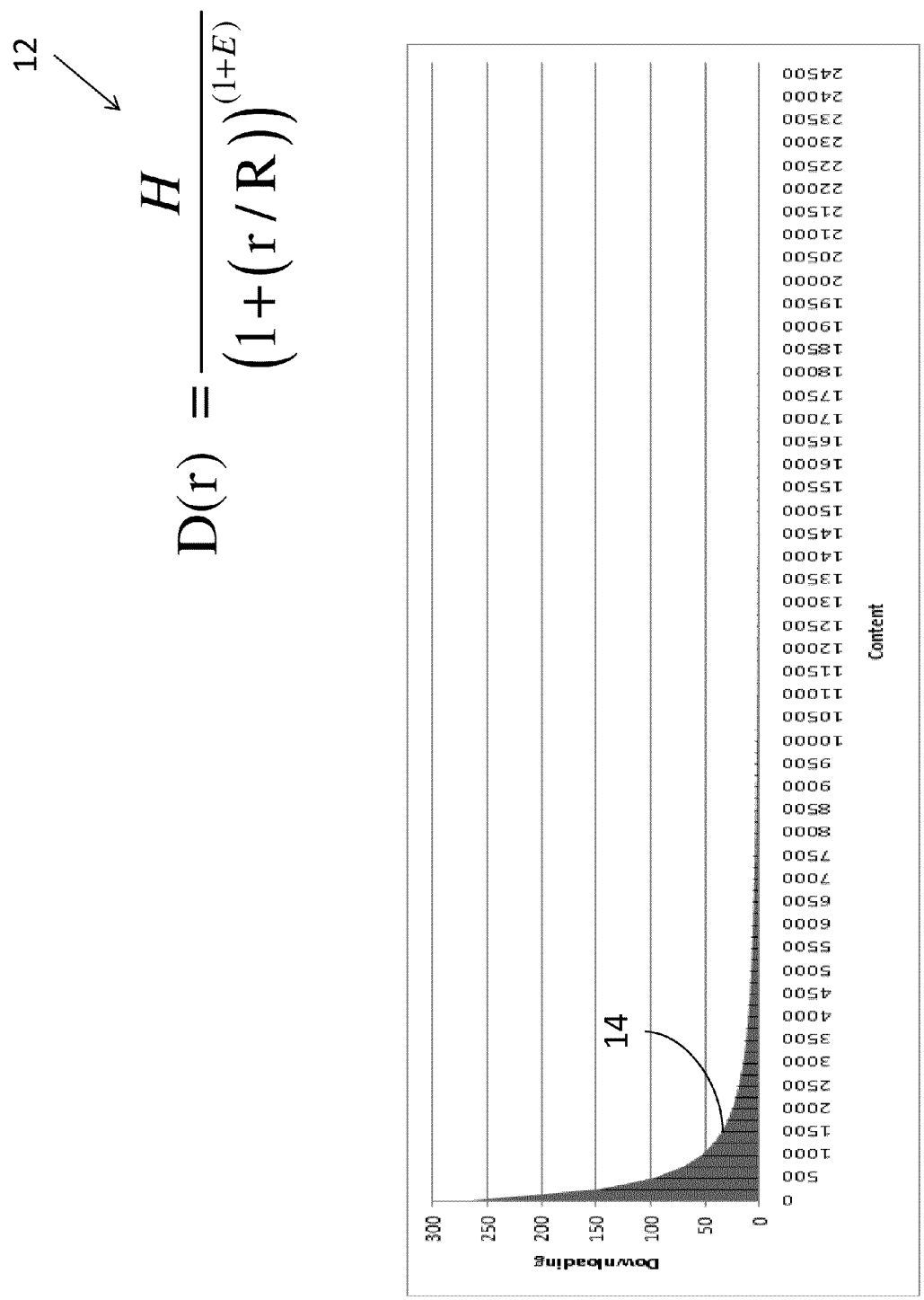
FIG. 1 is an example of a basic long tail power law distribution graph.

As popularized by the so-called Long Tail theory, the new era of on-line retail allows businesses to enlarge their product catalog endlessly, at nearly zero-cost. Once the full range of different products is made available to the people, it is an experimental fact that the demand curves exhibit a long tail shape, as shown in FIG. 1, whereby the demand for the lowest-ranked products does not fall sharply to zero (as it did in the pre-Internet era due to limited catalog offer, on the retailers part). The gist of the theory is that businesses can now monetize the long tail part of the demand. Moreover, the demand in the whole tail can actually add up to a percentage of sales that rivals the head of the curve.

Figure 2:
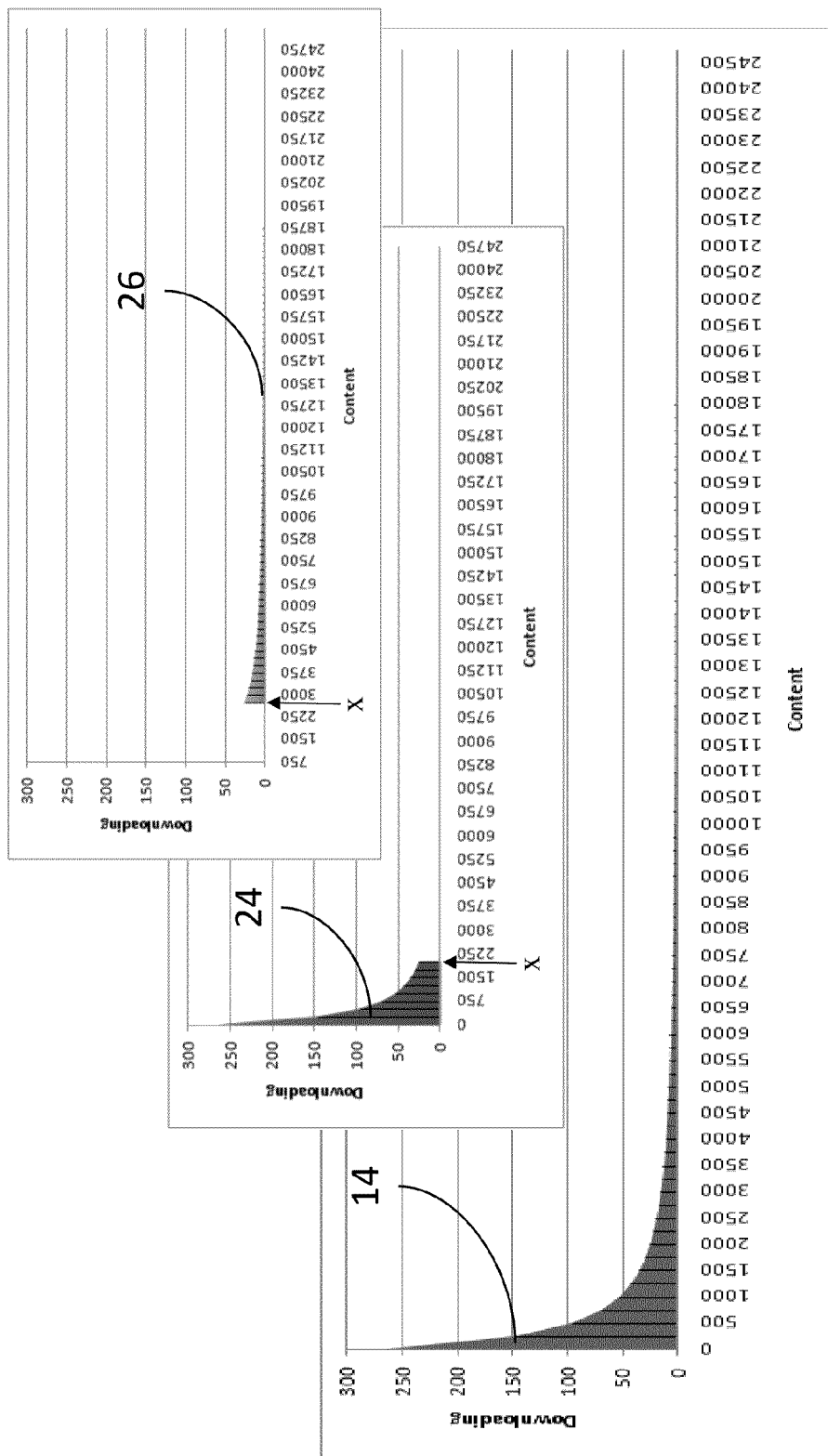
FIG. 2 shows separation of the head and tail of the basic long tail power law distribution graph of FIG. 1.

Referring to FIG. 1, for a given distribution, (such as by using a set of established parameters of the power law distribution as shown at 12) we depict the curve 14. FIG. 2 shows a separation of the curve 14 into two parts: head 24 and tail 26. In this manner, we can start to see the behavior of the head 24 and tail 26. We can arbitrarily choose, for the purpose of the example, the position of the value x separating the head 24 and tail 26. In the example shown in FIG. 2, we have used the value at x=1.9 thousand as the separation point, since it is the one that makes the areas under the curve (to the left and right of the x) equal.

Figure 3:
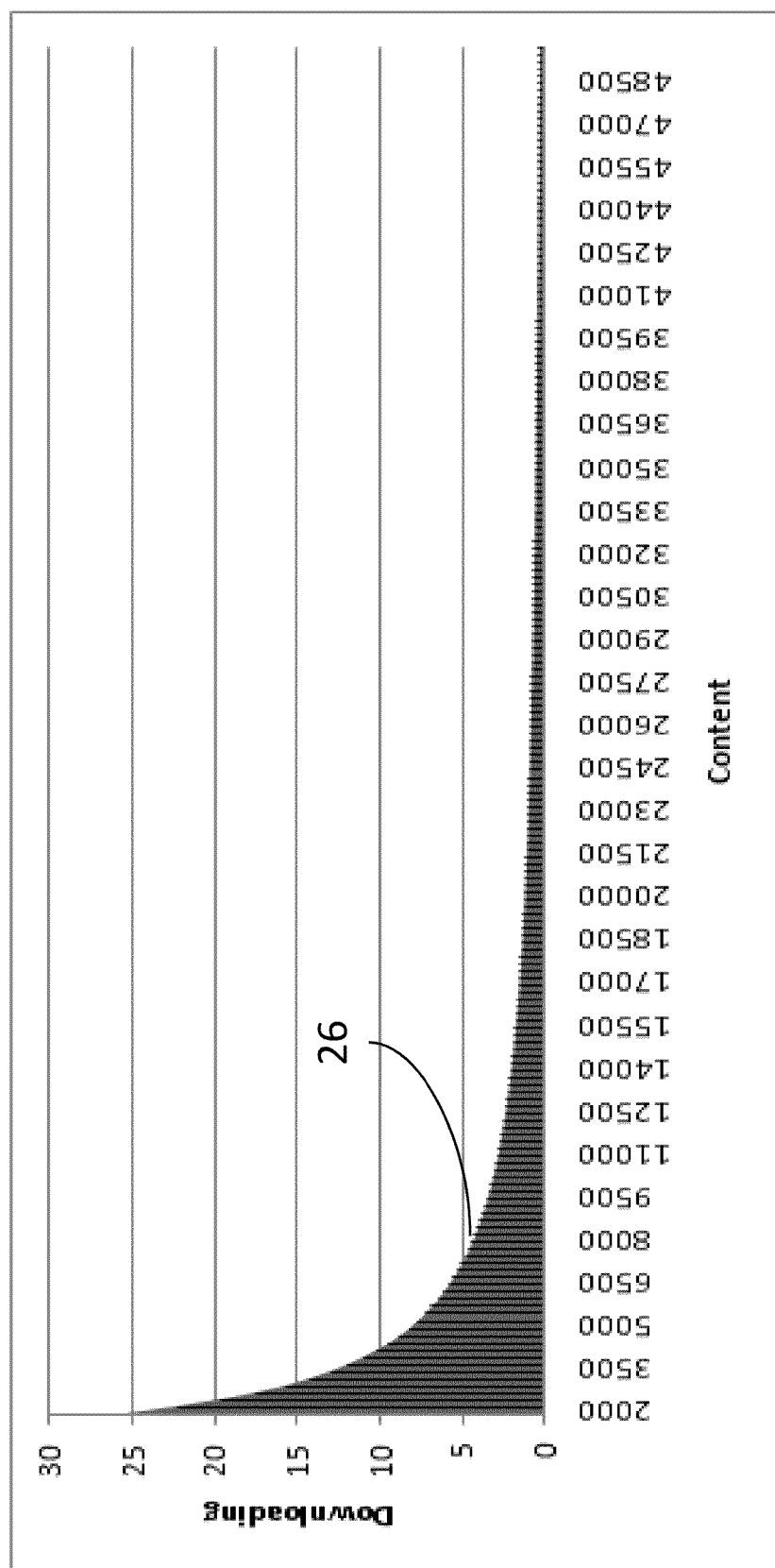
FIG. 3 is a close-up view of the tail portion of the graph in FIG. 2.
Figure 4:
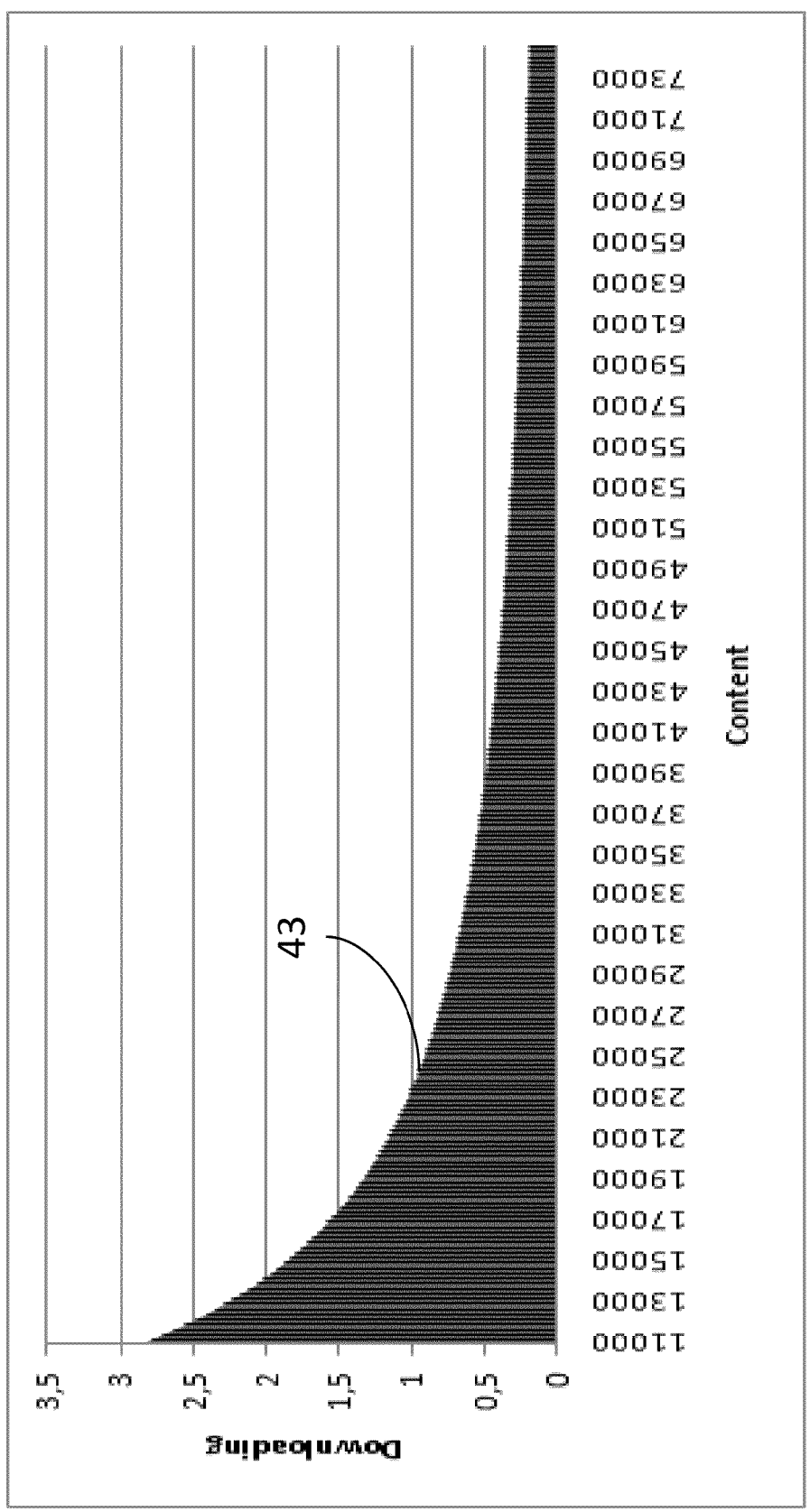
FIG. 4 is a further amplified view of the tail portion of the graph in FIG. 3.
Figure 5:
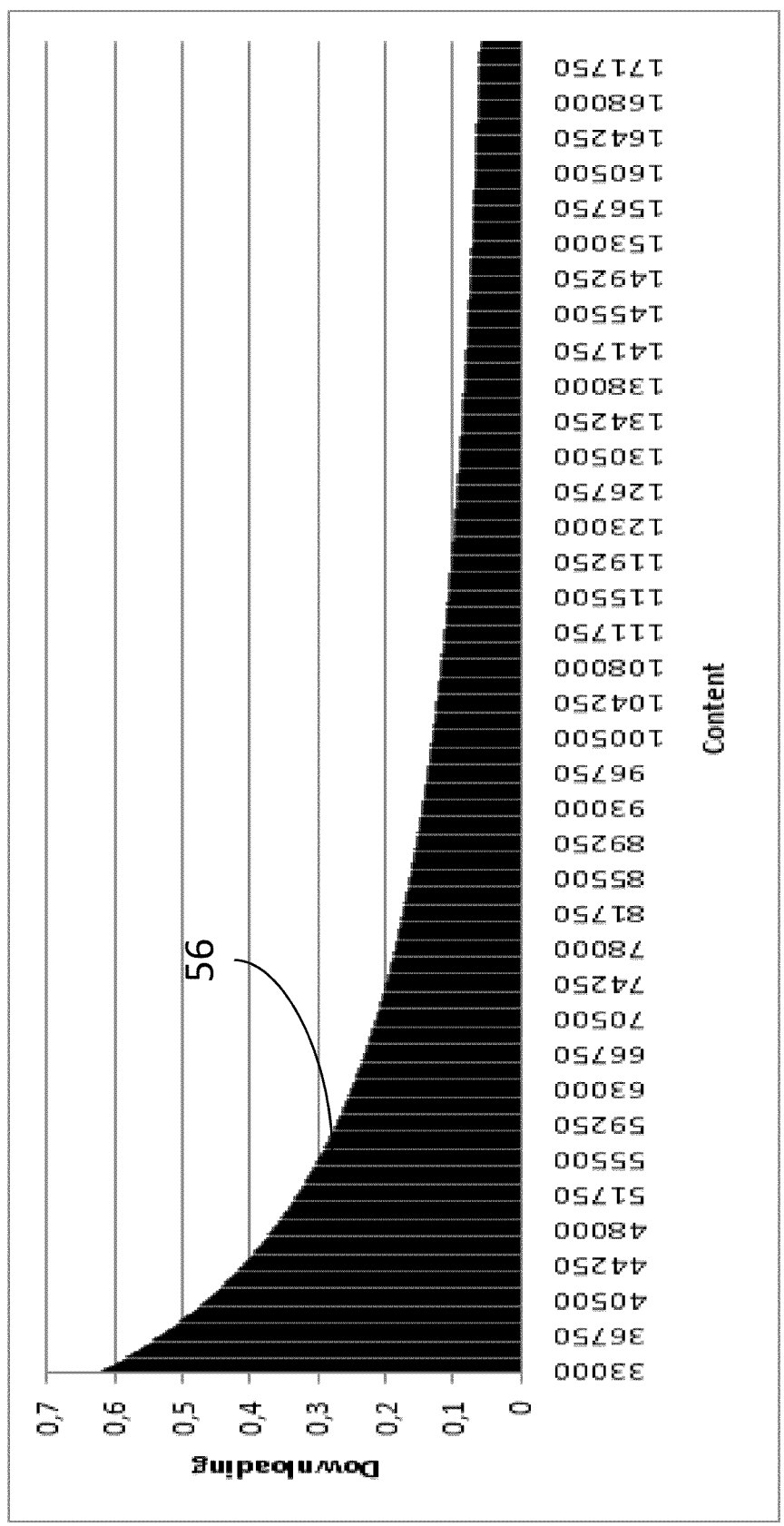
FIG. 5 is a further amplified view of the tail portion of the graph in FIG. 4.
Figure 6:
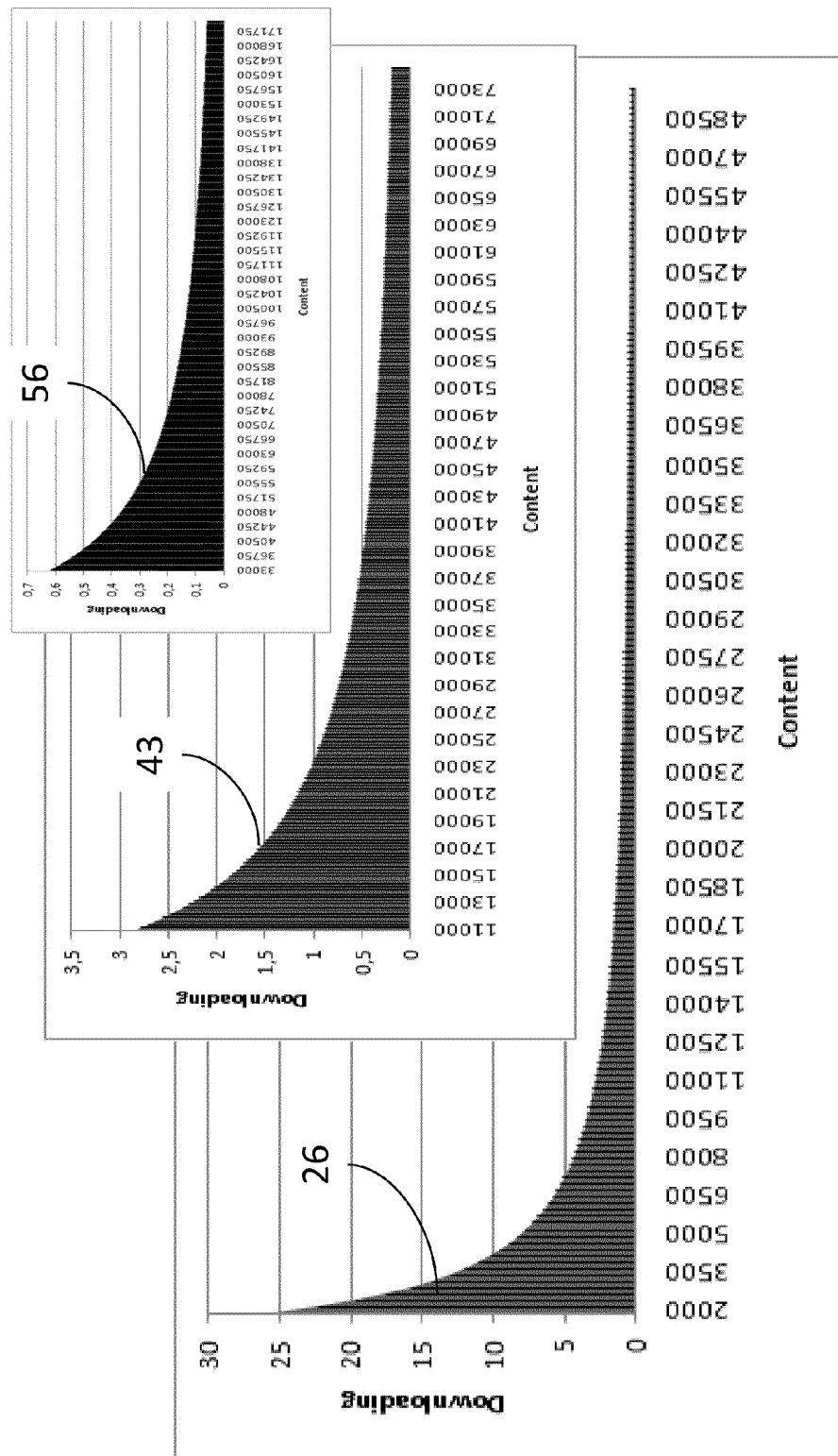
FIG. 6 shows a comparison of the tail portions shown in FIGS. 3, 4, and 5.

It is well known that every time we approach larger values in the x-axis of the content objects or goods, in an ordered manner with regard to the demand function, we can progressively see the tail of the tail (see FIGS. 3, 4, and 5). FIG. 3 shows a longer portion of tail 26 of FIG. 2 with a smaller scale x-axis. FIG. 4 shows a longer tail portion 43 of FIG. 3 with an even smaller scale x-axis. FIG. 5 shows a longer tail portion 56 of FIG. 4 with yet an even smaller scale x-axis. Note the change in scale size for the y-axis, as well. FIG. 6 shows the curves from FIGS. 3, 4, and 5 together, in order to indicate the relative change of scale in the x and y-axis, consecutively with scales ranging from 2 to 50 thousand in the x-axis and values from 0 to 25 in the y-axis 26 (FIG. 3); from 11 to 75 thousand in the x-axis and values from 0 to 2.75 in the y-axis 43 (FIG. 4); and from 33 to 175 thousand in the x-axis and values from 0 to 0.6 in the y-axis 56 (FIG. 5).

It is important to be able to model these curves correctly. However, the method hereby proposed is not intended to fit existing sales data to a mathematical model—after all, an on-line business already knows their current sales rank and the full demand curve.

Figure 7:
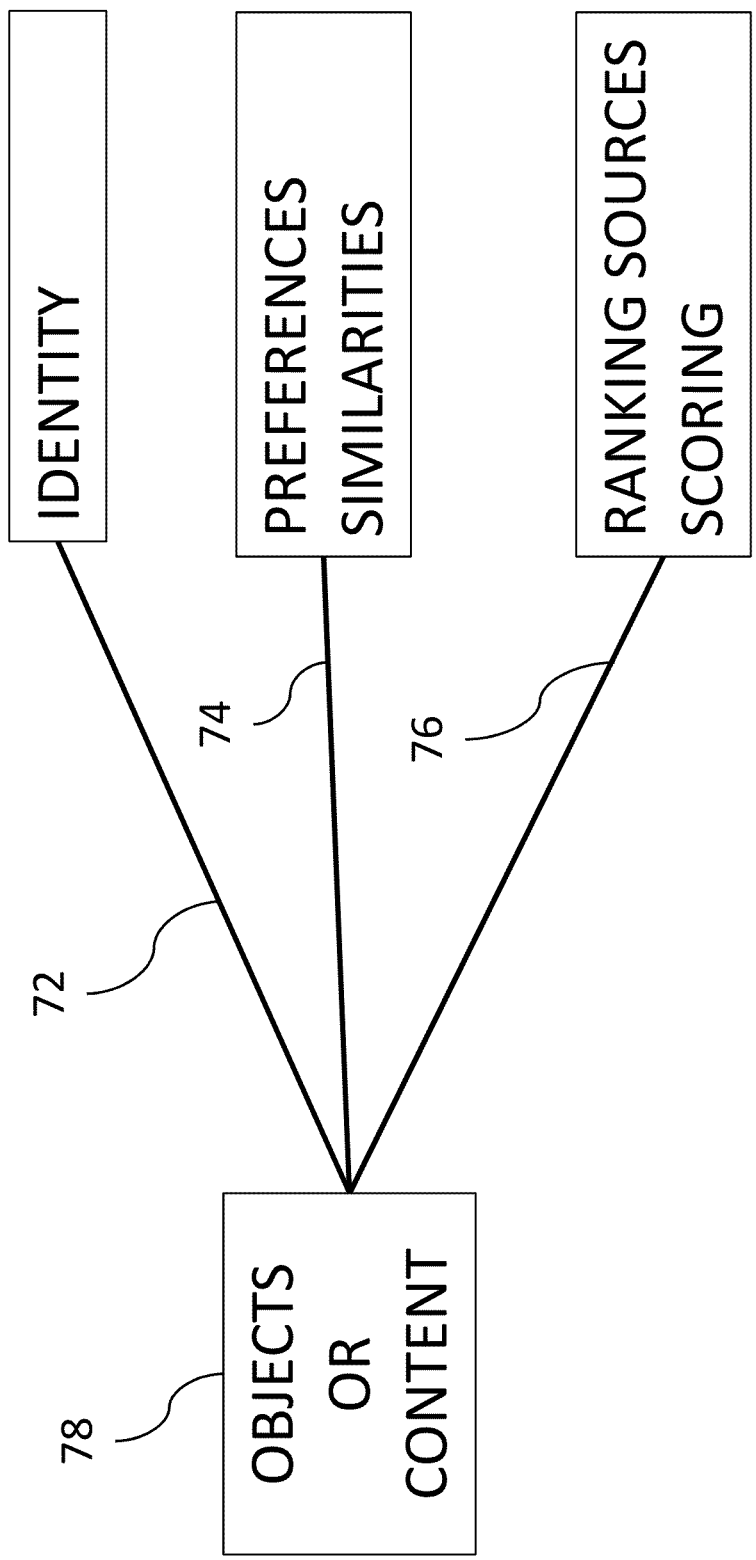
FIG. 7 shows the basic input for a scoring procedure according to an embodiment herein.

Referring to FIG. 7, the method actually constructs the demand curve for all objects or contents 78 (products, services, etc.), including those for which the ranking score 76 within the full universe is not known yet. All that is required is that the objects in the universe are well defined through a precise identity specification 72, a set of known scores for some of the objects, and a quantifiable measure of similarity 74 between all objects of the universe, from which we can generate scorings based on preferences calculated by similarity.

Embodiments of the method described herein are inspired on two ideas: the Von Neumann-Morgenstern utility theorem on the one hand, and the Elo rating system (used originally in chess for ranking players worldwide, and today widely used in many sports and games) on the other.

The Von Neumann-Morgenstern utility theorem states that if we have a set of decision preferences among the objects of a given set, then there exists a function on these objects that is able to reproduce the preferences (we can think of this utility function as an absolute ranking function). In the problem described here, we do not have preferences, but they are constructed based on the similarity measure concept. Invented by the Hungarian-born American physicist and chess master Arpad Elo, the Elo method is aimed at the ranking of multiple players based on matches within tournaments engaging two players at a time. It works by exchanging rating values between each two players according to the results of their match, using a precise formula designed to reproduce a scoring curve with a Gaussian distribution. After a sufficiently large number of tournaments, the emergent distribution of Elo ratings does reproduce the distribution that is expected theoretically.

The method described herein also works by iterating successive "tournaments" among objects of similar rank, but the precise mechanism for the interaction (i.e. exchange) of the ratings is now designed to achieve a power-law decay curve rather than the Gaussian distribution mentioned above. Since the domain where this problem first appeared is the media industry, we have dubbed this part of our method MELO tournaments, as in Media-Elo.

Figure 8:
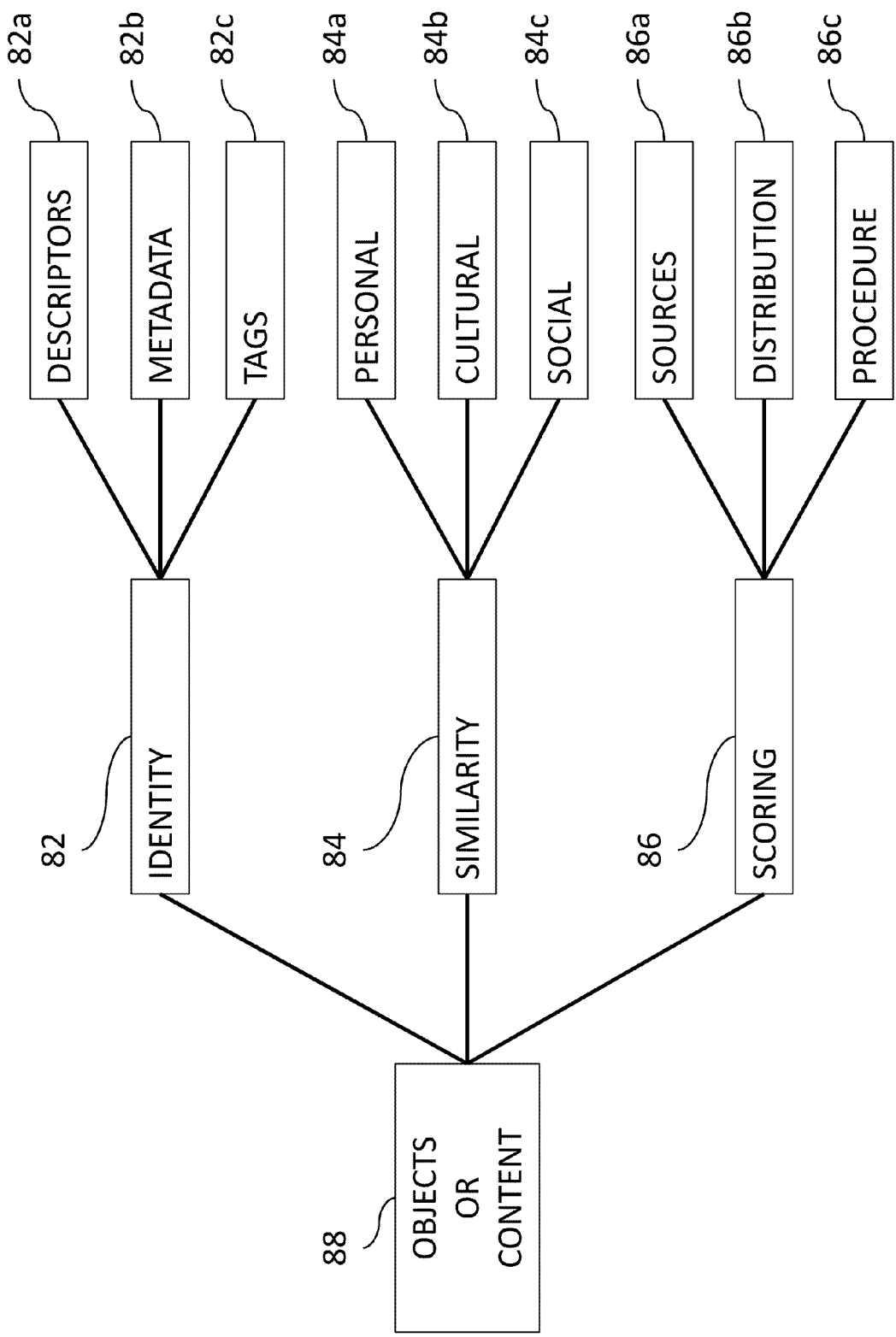
FIG. 8 shows some of the components for the basic input fields of FIG. 7 according to an embodiment herein.

Let us describe now the general procedure in detail. As shown in FIG. 8, it is first required that we have three ingredients:

a) A universe of objects or content 88 (products, downloads, etc.) with a well-defined identity 82, for which it is assumed that the scoring/demand curve will follow a Long Tail law. They will have to be very well defined with descriptors 82a intrinsic to the nature of the objects, metadata 82b, tags 82c, and others.

b) The scoring values 86 for a few objects, which will act as a source of reference for the scores of the rest of the objects. This can come from different sources 86a, and they can have different distributions 86b. Different objects can be scored using different scoring procedures 86c. Embodiments herein will treat the few objects with a Long Tail distribution (power law).

c) A quantitative scalar measure of similarity 84. The similarities defined on all the content set will be used to derive relative preferences among objects. These preferences are used by the method to re-compute scorings in an Elo-like process. Preferences could be derived from personal preferences 84a, cultural preferences 84b, and/or social networking extracted information 84c.

Figure 9:
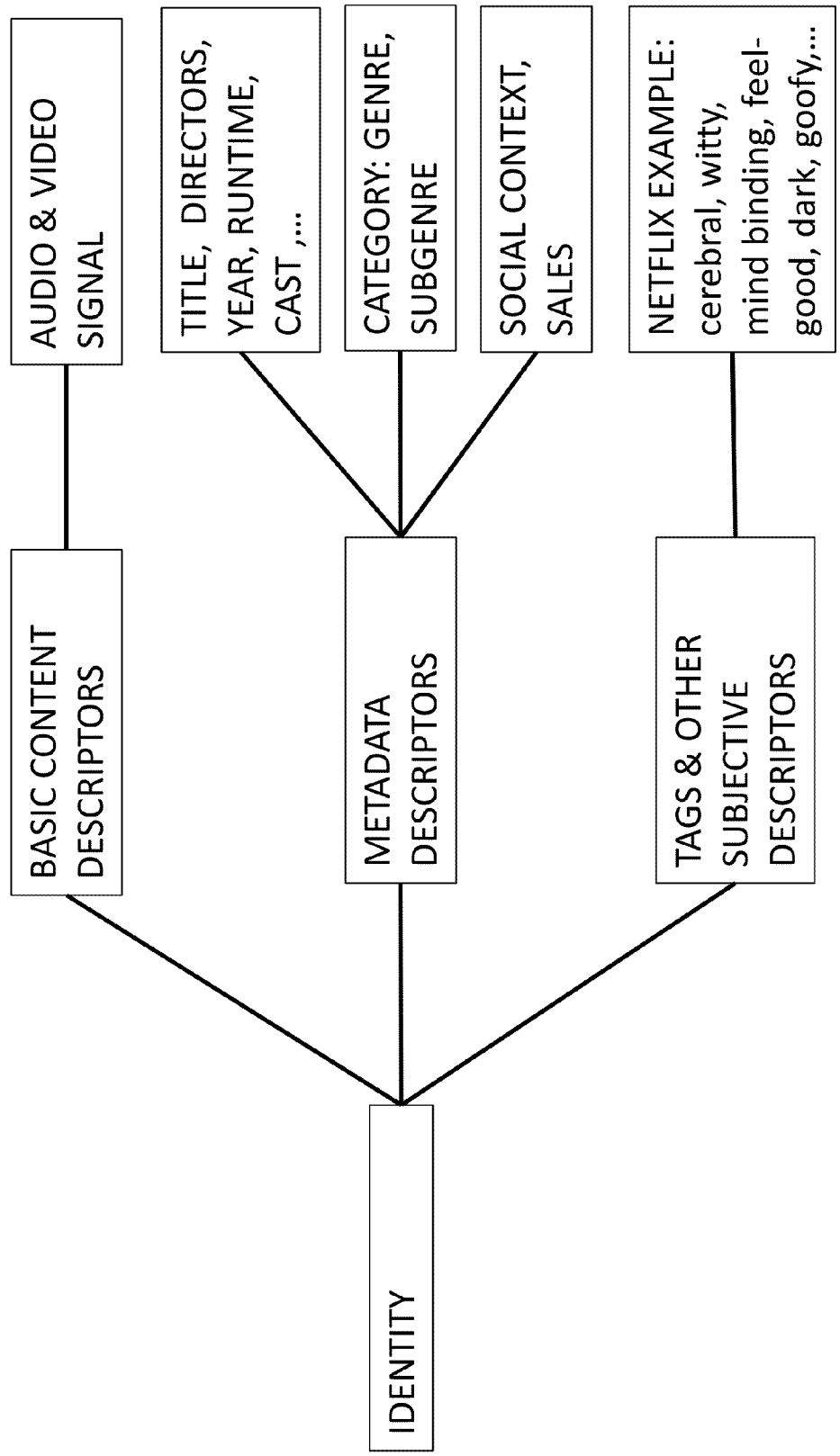
FIG. 9 shows some specific input fields used for scoring media or web content according to an embodiment herein.

FIG. 9 shows a specific example on the wide variety in media content that can be found in streaming or downloading films or videos, such as the parameters that can be found in the provider NETFLIX™. More generally, the method described herein produces a long tail scoring curve for any large set of objects, using only these elements: the scoring value of a few objects, which act as a source of reference values; a quantified measure of similarity between all objects; and the assumption that the scoring must follow a long tail decay as we progress towards the lowest ranked (i.e. a power-law).

According to the method described herein, we will construct a procedure to propagate the known scoring values of the few elements to all the content population, by means of the Elo-like wide tournament, where the 'game' is related to the proximity of the objects through the similarity measure between elements.

Let us denote with $\mu_{k_n}$ the score value of element $k_n$ in our universe. The demand curve is therefore given by the ordered set $\{\mu_{k_n}\}_{n=1\ to\ N}$ where $\mu_{k_n} > \mu_{k_{n+1}}$ for all n=1 to N. This is shown as curve 14 in FIG. 1, where one can see the decreasing ranking values in the y-axis as values increase in the x-axis.

The remaining Figures are used to illustrate the procedure in performing the following steps:

Initialization: all objects $k_n$ with unknown score value $\mu_{k_n}$ are assigned an arbitrary low score (e.g. zero); the reference objects are assigned their known score values. Without loss of generality, it may be assumed that these are all positive numbers, since if they were not we could then translate (using lambda as the absolute value of the least negative score, and translate by this lambda) and possibly scale the scoring ("y" vertical) axis.

Figure 10:
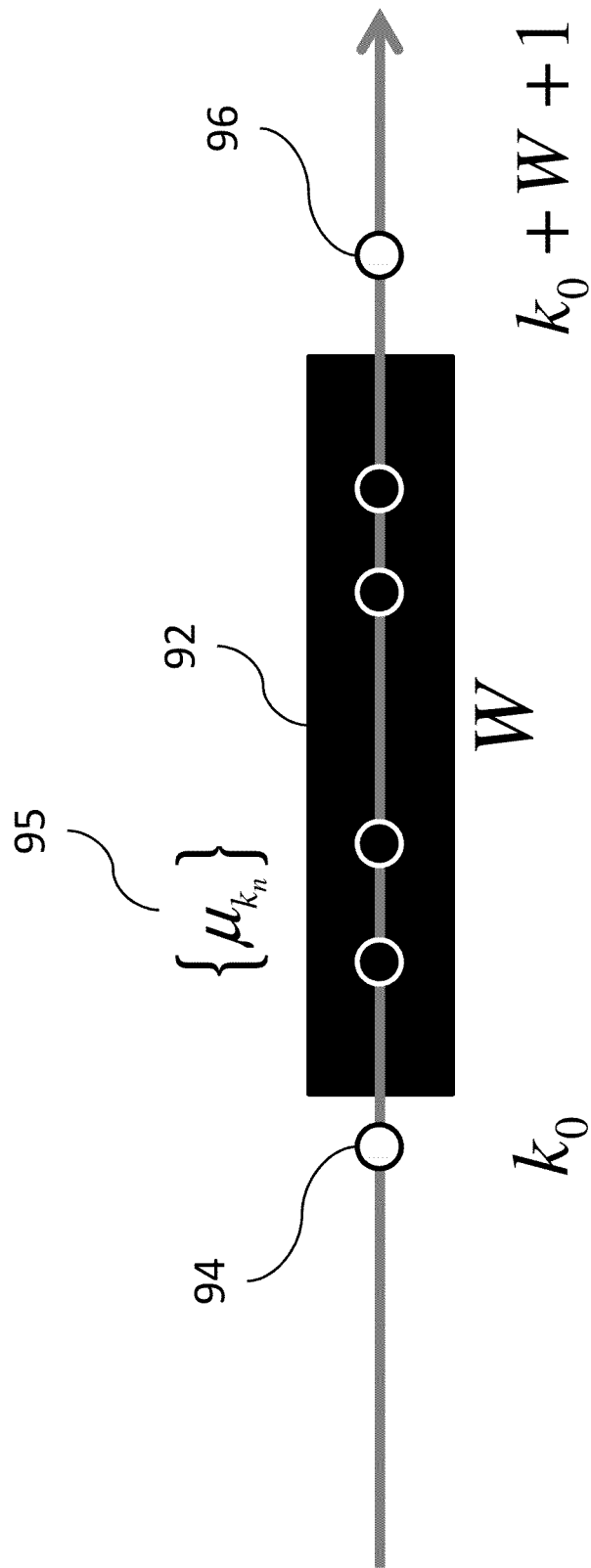
FIG. 10 illustrates a process step in a scoring procedure according to an embodiment herein.

Step 1 (FIG. 10)—select a "tournament window": a window 92 of consecutive objects within the current ordered set $\{\mu_{k_n}\}$ that will participate in the Elo-like tournament. The window 92, having a width W, starts after some point $k_0$ 94. As discussed below, both the size W of the window and the selection of the window location are not essential for the method to work. Randomly selected locations for the start of the window after $k_0$ as well as the end of the window at $k_0+W+1$ 96, determined by a fixed value of window width W of about ten to a thousand objects, yield good results, demonstrating the robustness of the method.

Figure 11:
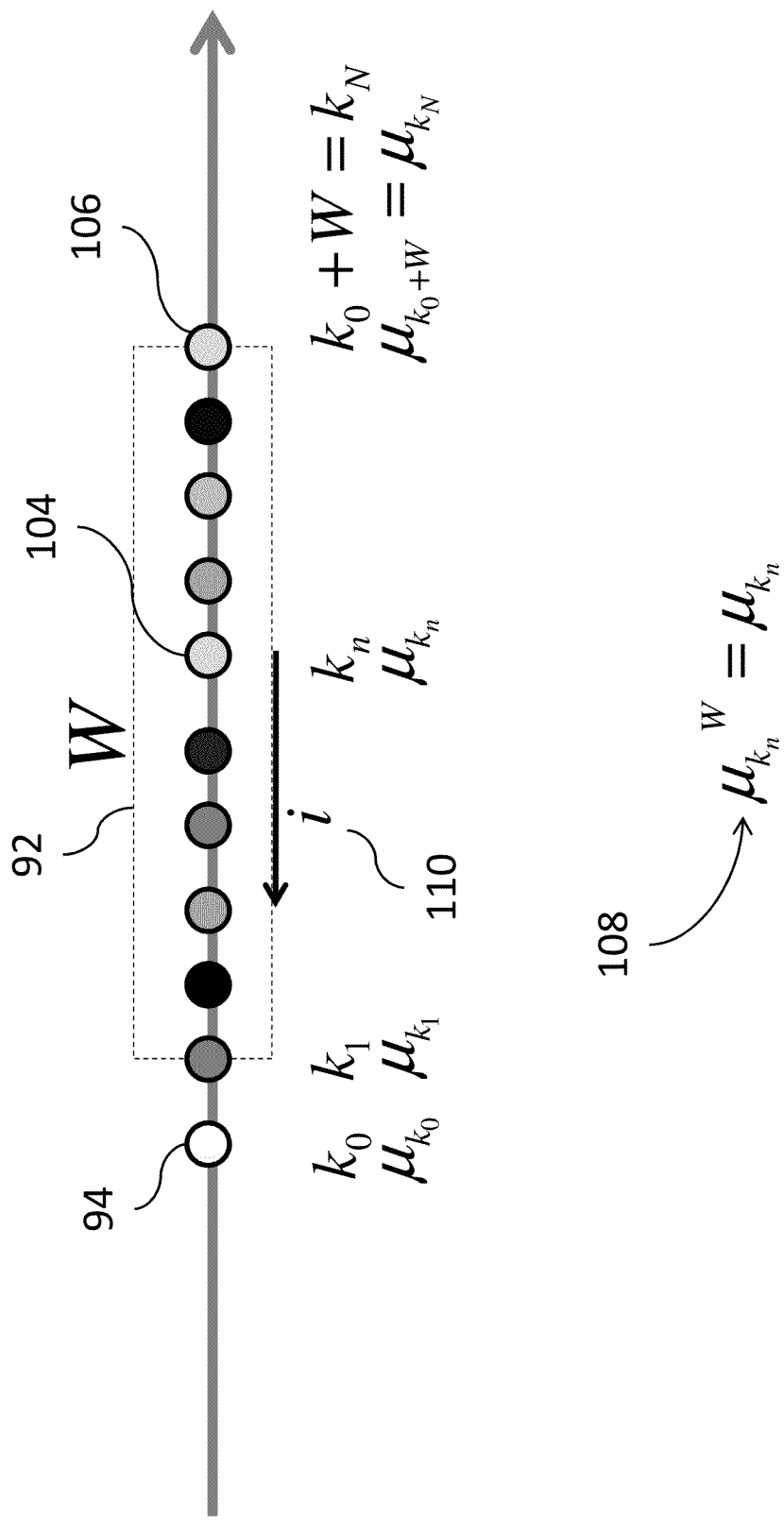
FIG. 11 illustrates the process for handling similarity based recursive preferences according to an embodiment herein.

Step 2 (FIG. 11)—use similarities among objects to construct the window. Compute the utility-function-like preferences for the items $k_n$ 104 in the window 92, using the similarity values according to the following averaging procedure: for every $\mu_{k_n}$ within the window 92, compute its temporary preference score $\mu_{k_n}^W$ 108 as the average value $\mu_{k_n}$ of over over the object and its nearest neighbors in the universe (see FIG. 12, 121). Note that the temporary preference score $\mu_{k_n}^W$ 108 is initially based on the similarity of objects. $\mu_{k_n}^W$ 108 represents the preference for an object in relation to the window 92. That is, for any given object $k_n$=A 112 within the window, there will be several neighbor objects 116. If we denote the set of nearest neighbors of object A by {A} 114, we calculate the preference score $$\mu_A^W = \frac{1}{\#\{A\}} \sum_{\{A\}} \mu_A$$

115. The set of nearest neighbor objects 116 to a given object A can be found using an arbitrarily chosen cut-off value $\rho$ 118 for the similarity values that we have for the problem at hand (again, the method is robust against variations in this cut-off value). Then, the temporary scores $\mu_{k_n}^W$ 108 is used to reorder the subset $\{\mu_{k_n}\}_{n=1\ to\ N}$ within the window 92 from least preferred to most preferred along an increasing value for i 110. This results in the subset $\{\mu_{k_n}\}_{n=1\ to\ N}$ shown in FIG. 13 in which the objects $k_n$ 120 are reordered according to preference.

Step 3 (FIGS. 14 and 15)—redefine the scoring values according to this MELO procedure, which is designed to achieve convergence and fit the desired distribution of a long tail curve. Given $k_0$ 94 as a boundary element outside the window 92 with a preference score $\mu_{k_0}$, begin by assigning a score $$\mu_{k_1} = \left(1 + \frac{E+1}{R+k_0}\right)\mu_{k_0}$$

Figure 15:
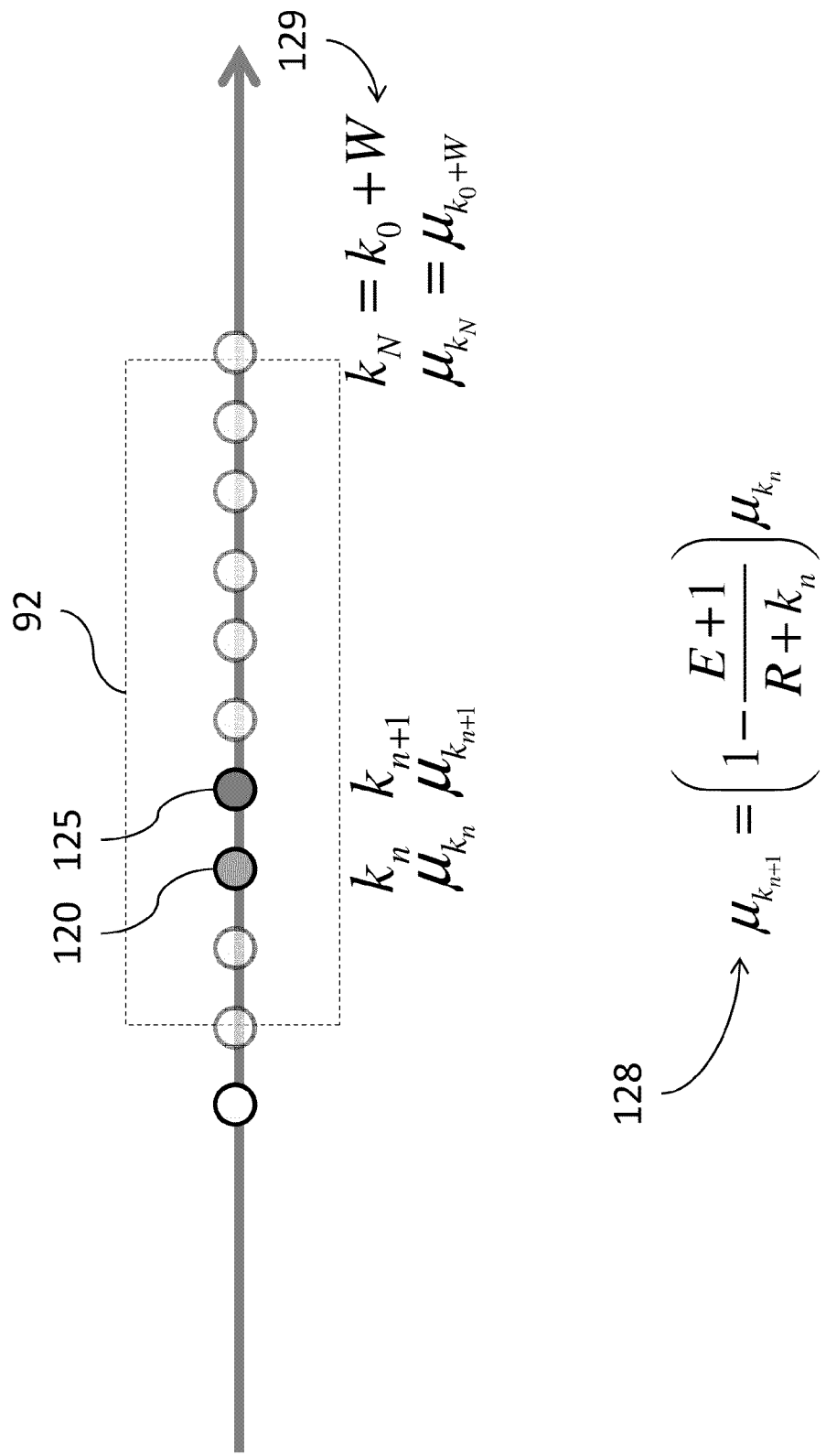
FIG. 15 illustrates a process step in a scoring procedure according to an embodiment herein.

124 to $k_1$ 122. Then compute the rest of the preference scores in the window recursively from $k_1$ 122 by making the score at each stage n+1 based on the score calculated at stage n+1; that is, as shown in FIG. 15, for $k_{n+1}$ 125 its score as a function of the score for $\mu_{k_n}$ is defined as $$\mu_{k_{n+1}} = \left(1 - \frac{E+1}{R+k_n}\right)\mu_{k_n}$$

128 until $k_n=k_N$ or $k_N=k_0+W$ 129. The values of E and R are adjusted a posteriori, once the procedure converges. Parameter E is the exponent of the power law, while R governs the rank value of the "x" axis (objects) of the long tail curve.

Figure 16:
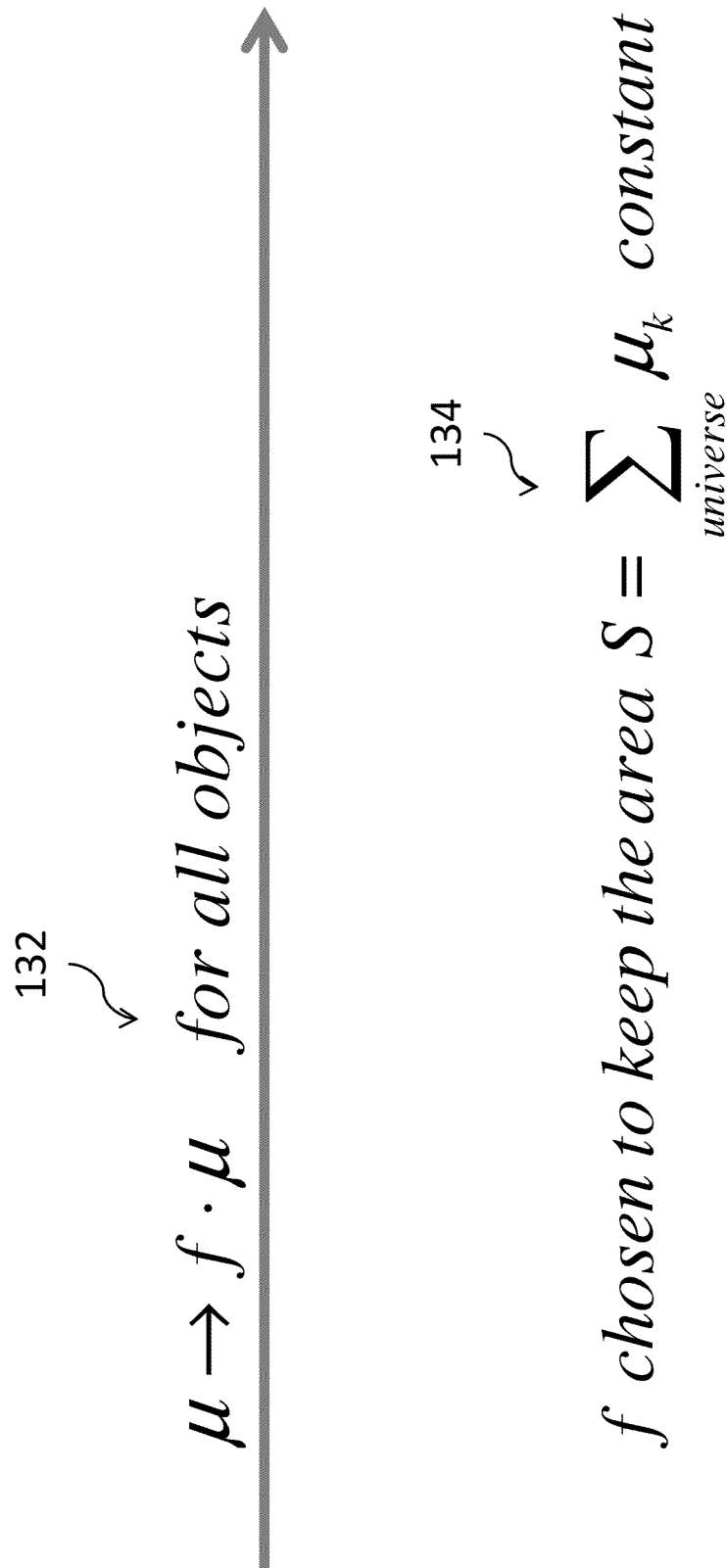
FIG. 16 illustrates a process step in a scoring procedure according to an embodiment herein.

Step 4 (FIG. 16) is a renormalization step: all values in the universe $\mu_{k_n} \rightarrow f\mu_{k_n}$ 132 are adjusted using a normalization factor $$f = \frac{S}{\sum_{n=1\ to\ N} \mu_{k_n}}$$

134 designed so as to maintain a constant area or surface S under the curve during the course of the whole procedure.

Repeat the procedure from step 1 to 4, until convergence in the values $\{\mu_{k_n}\}$ is reached.

This procedure has been found to be robust with respect to small variations in the choice of the size W of the tournament window 92. Larger windows may accelerate the convergence rate of the iterations, but this has to be weighed against the correspondingly larger O(w log w) computational costs due to sorting. Additionally, the convergence is not greatly affected by the particular strategy that is chosen for the location of the windows (index $k_0$): it is found that a randomly chosen index $k_0$ works just as well as choosing a back-and-forth sliding window. Similarly, the computation of the temporary preference scores within the tournament window (see FIG. 12) is dependent upon some cut-off parameter $\rho$ 118 that needs to be chosen according to the particular typical values that we have available for the similarity values. Again, it is found that the final results are not very sensitive to this cut-off value $\rho$ 118, provided we choose it sensibly: one should use a value big enough so that objects have on average at least a few neighbors, but not so big as to make the full universe 121 their neighbor.

Described herein is a Long Tail Monetization Procedure for contents or goods on the internet, mobile devices, and other commerce platforms. Detailed below is a concrete implementation of the procedure on a two dimensional model, in order to show the feasibility of the industrial application of embodiments herein.

First, consider a geometric two-dimensional model in which the objects under study (our universe) are a set of N randomly chosen points $(x_k, y_k)$ within a rectangular domain of dimensions Xmax and Ymax. In other words, $$9 \leq x_k \leq X_{max}$$

$$0 \leq y_k \leq Y_{max}$$

for k=1, . . . , N. Of course, once we have picked these N points we will not change them during our procedure, since they are our universe of well-defined objects $k_n$ (points). Their identities are uniquely defined by their two-dimensional coordinates $k_n = (x_{k_n}, y_{k_n})$ We now need to assume a known value for the scoring of some of these points. We may randomly assign some starting values for the scoring μ to a fraction of the N points; these will become our "reference seeds" for the final emergent scoring function. One may experiment the whole procedure with varying values of this fraction, as the results are robust with respect to this value. In addition, for the purposes of this embodiment, we will assume that the scoring values $\mu_k$ are positive.

Only one more ingredient is needed now, namely a quantitative measure of similarity between points. For this, we will use the usual Euclidean metric in two dimensions.

Again, using FIGS. 10-16, we can now start the constructive procedure to compute the scoring curve for our universe, following these steps:

Initialization: all points $k_n = (x_{k_n}, y_{k_n})$ with an unknown score value $\mu_{k_n}$ are assigned a zero score, while the reference objects are assigned their known score values.

Step 1—select a "tournament window": a window 92 of consecutive points within the current ordered set $\{\mu_{k_n}\}$ 95, on which the Elo-like tournament will take place. The window 92 starts after some point $k_0$ 94, and has a width W. As discussed below, both the size W of the window and the selection of the window location are not essential for the method to work. Randomly selected locations for the start of the window after $k_0$ as well as the end of the window 92 at $k_0+W+1$ 96, determined by a fixed value of window width W of about ten to a thousand objects, yield good results, demonstrating the robustness of the method.

Figure 12:
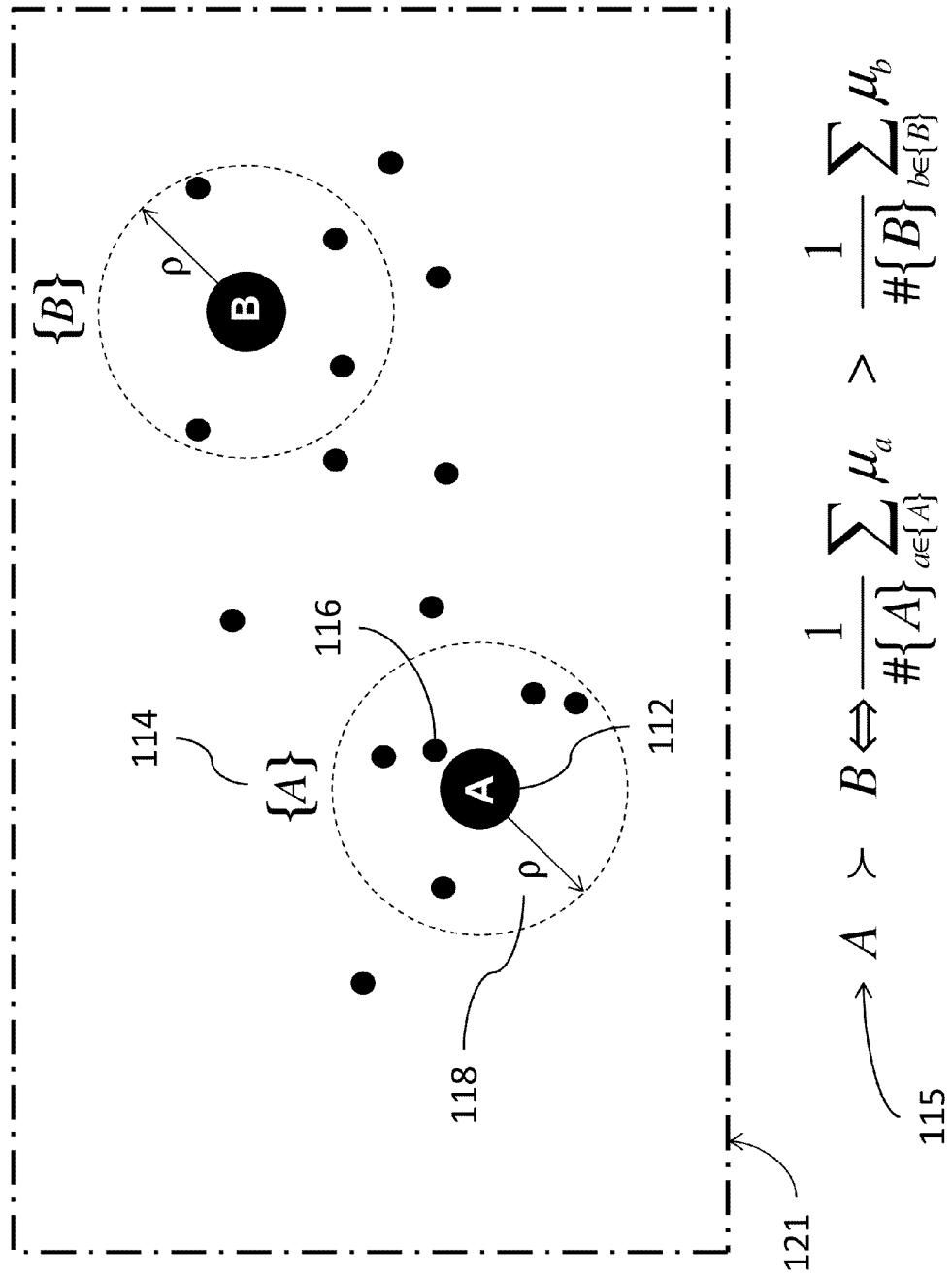
FIG. 12 illustrates a process step in a scoring procedure according to an embodiment herein.
Figure 13:
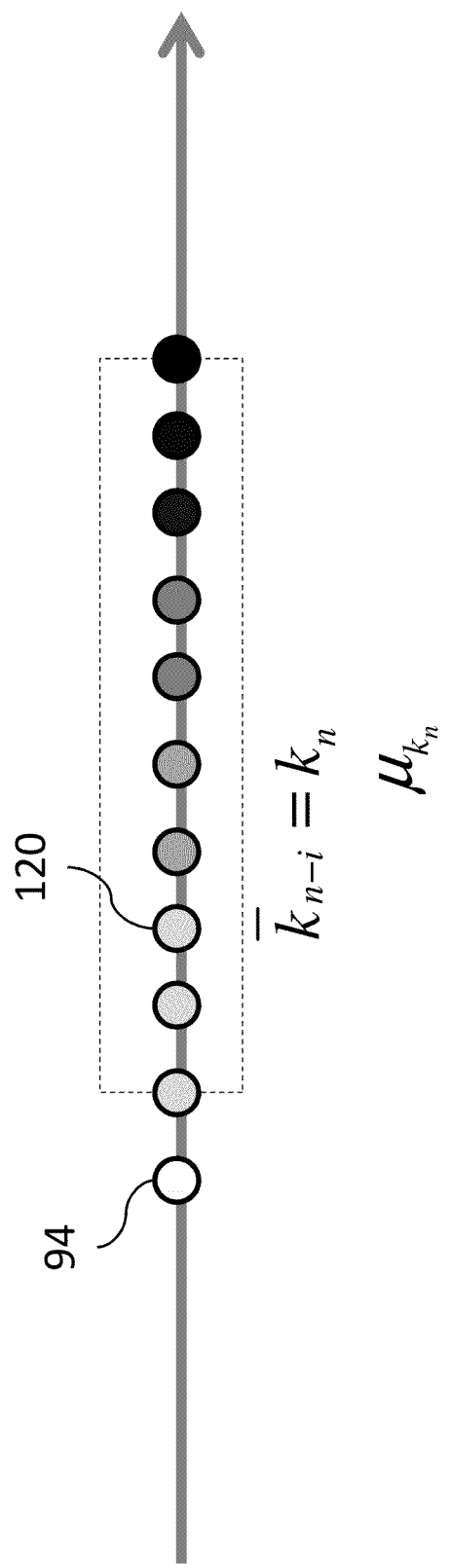
FIG. 13 illustrates a process step in a scoring procedure according to an embodiment herein.

Step 2—compute the utility-function-like preferences for the items $k_n$ 104 in the window 92 using the similarity values according to the following averaging procedure: for every $\mu_k$ within the window 92, compute its temporary preference score $\mu_{k_n}^W$ 108 as the average value of $\mu_{k_n}$ over over the object and its nearest neighbors in the universe (see FIG. 12, 121). The set of nearest neighbors to a given object $k_n = (x_{k_n}, y_{k_n})$ is to be found using an arbitrarily chosen cut-off value ρ 118 for the similarity. In this case, this should be a suitable distance in two-dimensional space, so that the neighborhoods are neither too large nor too small considering the boundaries (Xmax, Ymax) where our universe lives. Then, use their temporary scores $\mu_{k_n}^W$ 108 to reorder the subset $\{\mu_{k_n}\}_{n=1 \text{ to } N}$ within the window 92 as shown in FIG. 13.

Step 3—calculate new scoring values according to this MELO procedure, which is designed to achieve convergence to a long tail curve. We have $k_0$ 94 as our first boundary element outside the window and its score $\mu_{k_0}$. Start with element $k_1$ 122 by assigning the preference score $\mu_{k_1} = $ $$\mu_{k_1} = \left(1 - \frac{E+1}{R+k_0}\right)\mu_{k_0}$$

Figure 14:
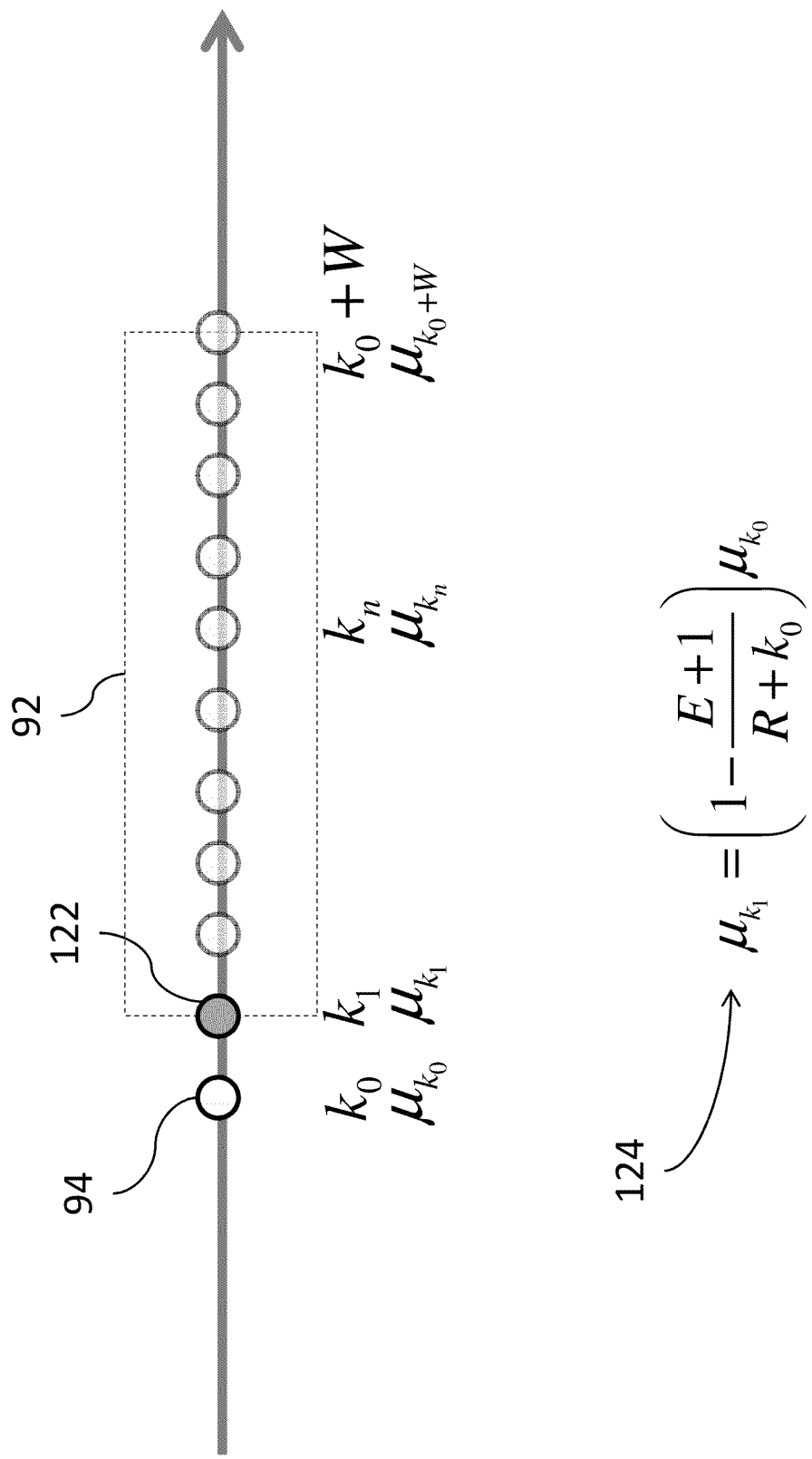
FIG. 14 illustrates the process for handling similarity based recursive preferences according to an embodiment herein.

124 (FIG. 14). Then compute the rest of the scores in the window 92 recursively starting from $k_1$ by making the score of $k_{n+1}$ 125 a function of the score of $k_n$ 120 using the recursive formula $$\mu_{k_{n+1}} = \left(1 + \frac{E+1}{R+k_n}\right)\mu_{k_n}$$

128 until $k_n = k_0 + W$ (see FIG. 15, 129). The values of E and R are adjusted a posteriori, once the procedure converges. Parameter E is the exponent of the power-law, while R governs the rank value of the "x" axis (objects) of the long tail curve.

Step 4—renormalization: all values in the universe $\mu_{k_n} \to f\mu_{k_n}$ 132 are adjusted using a normalization factor $$f = \frac{S}{\sum_{n=1 \text{ to } N} \mu_{k_n}}$$

134, designed so as to maintain a constant area or surface S under the curve during the course of the whole procedure.

Repeat the procedure from step 1 to 4, until convergence in the values $\{\mu_{k_n}\}_{n=1 \text{ to } N}$ is reached.

It is expected that any person skilled in the art can implement the disclosed procedure on a computer, and verify the emergent scoring curve for various realizations of the parameters in this example model. The generalization of the procedure to real-world scenarios with other definitions for the similarity measure should be evident to any person skilled in the art.

The invention has been described with references to specific embodiments. While particular values, relationships, materials and steps have been set forth for purposes of describing concepts of the invention, it will be appreciated by persons skilled in the art that numerous variations and/or modifications may be made to the invention as shown in the disclosed embodiments without departing from the spirit or scope of the basic concepts and operating principles of the invention as broadly described. It should be recognized that, in the light of the above teachings, those skilled in the art could modify those specifics without departing from the invention taught herein. Having now fully set forth certain embodiments and modifications of the concept underlying the present invention, various other embodiments as well as potential variations and modifications of the embodiments shown and described herein will obviously occur to those skilled in the art upon becoming familiar with such underlying concept. It is intended to include all such modifications, alternatives and other embodiments insofar as they come within the scope of the appended claims or equivalents thereof. It should be understood, therefore, that the invention might be practiced otherwise than as specifically set forth herein. Consequently, the present embodiments are to be considered in all respects as illustrative and not restrictive.

The corresponding structures, materials, acts, and equivalents of all means or step plus function elements in the claims below are intended to include any structure, material, or act for performing the function in combination with other claimed elements as specifically claimed. The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method of determining monetization for a long tail demand curve, said method comprising:
analyzing a demand curve comprising an ordered set of objects, each object of said ordered set having a defined identity, said ordered set of objects including a set of reference objects each having a corresponding known preference score value and another set of objects each not having a corresponding known preference score value, using a computerized device;
assigning a first temporary preference score value of zero to each object of said another set of objects not having a corresponding known preference score value, using said computerized device;
selecting a window of consecutive objects from said ordered set of objects, using said computerized device, said window including a first subset of reference objects each having said corresponding known preference score value and a second subset of objects each having a corresponding preference score value of zero;
calculating a second temporary preference score value for each object of said second subset of objects in said window, based on similarity to a nearest object in said first subset of reference objects to generate a set of second temporary preference score values, using said computerized device;
reordering all objects in said window based on said set of second temporary preference score values and said known preference score values of said first subset of reference objects, using said computerized device;
calculating a new score value for each object in said window using a power-law exponential equation, using said computerized device, said calculating being performed by obtaining a score value to a boundary element and recursively calculating said corresponding new score for each object in said window based on said score value of said boundary element and said corresponding second temporary preference score value or said corresponding known preference score value of said object to generate a set of new score values of said window, said boundary element being an object in said ordered set of objects outside of said window; and
adjusting all objects in said ordered set of objects based on said set of new score values of said window.

2. The method of claim 1, said power-law exponential equation comprising:

$$\mu_{k_1} = \left(1 - \frac{E+1}{R+k_0}\right)\mu_{k_0}$$

where
$k_0$ comprises said boundary element outside said window,
$\mu_{k_0}$ comprises said score value for said boundary element $k_0$,
E comprises an exponent of said power-law, and
R governs a rank value of objects along said long tail demand curve.

3. The method of claim 2, wherein said recursively calculating said corresponding new score value for each object in said window starts from element $k_1$ using a recursive formula $$\mu_{k_{n+1}} = \left(1 + \frac{E+1}{R+k_n}\right)\mu_{k_n}$$

until $k=k_0+W$, using said computerized device,
where
$k_0$ comprises said boundary element outside said window,
$k_n$ comprises a next element in said window,
W comprises a number of elements in said window,
$\mu_{k_n}$ comprises said corresponding preference score value for element $k_n$,
$\mu_{k_{n+1}}$ comprises said corresponding preference score value for element $k_{n+1}$,
E comprises an exponent of said power-law, and
R governs a rank value of objects along said long tail demand curve.

4. The method of claim 1, further comprising:
normalizing said corresponding new score value for all objects in said ordered set of objects, using said computerized device.

5. The method of claim 4, said normalizing comprising using a normalization factor designed to maintain a constant area under said long tail demand curve.

6. The method of claim 5, said normalization factor comprising:

$$f = \frac{S}{\sum_{n=1 to N} \mu_{k_n}}$$

where
f comprises said normalization factor,
$\mu_{k_n}$ comprises said corresponding preference score value for each element $k_n$ in said window,
S comprises said area under said long tail demand curve, and
N comprises a number of objects in said window.

7. The method of claim 1, said calculating said second temporary preference score value comprising using an equation $$\mu_A^{Win} = \frac{1}{\#\{A\}} \sum_{\{A\}} the \mu_A$$

where
$\mu_A^W$ comprises said second temporary preference score value in said window W,
$\{A\}$ comprises a set of objects within a specified distance from an object A in said window W,
$\mu_A$ comprises said corresponding known preference score value for element A in said window W, and
$\#\{A\}$ comprises a number of objects in said set $\{A\}$.

8. The method of claim 1, said window comprising more than ten objects.

9. The method of claim 1, said window comprising less than a thousand objects.

10. A computer implemented method of determining monetization for a long tail demand curve, said method comprising:

providing a demand curve comprising an ordered set of objects, each object in said ordered set having a defined identity, said ordered set of objects including a set of reference objects each having a corresponding known preference score value and another set of objects each not having a corresponding known preference score value, using a computerized device;

selecting a first window of consecutive objects from said ordered set of objects, using said computerized device, said first window including a first subset of reference objects each having said corresponding known preference score value and a second subset of objects each not having a corresponding preference score value;

calculating a temporary preference score value for each object of said second subset of objects in said first window, based on similarity to a nearest object in said first subset of reference objects to generate a set of temporary preference score values, using said computerized device;

reordering all objects in said first window based on said set of temporary preference score values and said known preference score values of said first subset of reference objects, using said computerized device;

calculating a new score value for each object in said first window, using a power-law exponential equation, using said computerized device, said calculating being performed by obtaining a score value to a boundary element and recursively calculating said corresponding new score for each object in said first window based on said score value of said boundary element and said corresponding temporary preference score value or said corresponding known preference score value of said object to generate a set of new score values of said first window, said boundary element being an object in said ordered set of objects outside of said first window; and adjusting all objects in said ordered set of objects based on said set of new score values of said first window.

11. The computer implemented method of claim 10, further comprising:

selecting a second window of consecutive objects from said ordered set of objects, using said computerized device, said second window including a first subset of reference objects each having a corresponding known preference score value and a second subset of objects each not having a corresponding known preference score value;

calculating a temporary preference score value for each object in said second subset of objects in said second window, based on similarity to a nearest object of said first subset of reference objects to generate a set of temporary preference score values, using said computerized device;

reordering all objects in said second window based on said set of second temporary preference score values and said known preference score values of said first subset of reference objects, using said computerized device;

calculating a new score value for each object in said second window, using a power-law exponential equation, using said computerized device, said calculating being performed by obtaining a score value to a boundary element and recursively calculating said corresponding new score for each object in said second window based on said score value of said boundary element and said corresponding second temporary preference score value or said corresponding known preference score value of said object to generate a set of new score values, of said second window, said boundary element being an object in said ordered set of objects outside of said second window; and adjusting all objects in said ordered set of objects based on said set of new score values of said second window.

12. The computer implemented method of claim 10, said power-law exponential equation comprising:

$$\mu_{k_1} = \left(1 - \frac{E+1}{R+k_0}\right)\mu_{k_0}$$

where $k_0$ comprises said boundary element outside said first window, $\mu_{k_0}$ comprises said corresponding known preference score value for said boundary element $k_0$, E comprises an exponent of said power-law, and R governs a rank value of objects along said long tail demand curve.

13. The computer implemented method of claim 12, wherein said recursively calculating said corresponding new score value for each object in said first window starts from element $k_1$ using a recursive formula $$\mu_{k_{n+1}} = \left(1 + \frac{E+1}{R+k_n}\right)\mu_{k_n}$$

until $k=k_0+W$, using said computerized device, where $k_0$ comprises a boundary element outside said first window, $k_n$ comprises a next element in said first window, W comprises a number of elements in said first window, $\mu_{k_n}$ comprises said corresponding preference score value for element $k_n$, $\mu_{k_{n+1}}$ comprises said corresponding preference score value for element $k_{n+1}$, E comprises an exponent of said power-law, and R governs a rank value of objects along said long tail demand curve.

14. The computer implemented method of claim 10, further comprising:

normalizing said corresponding new score value for all objects in said ordered set of objects, using said computerized device.

15. The computer implemented method of claim 14, said normalizing comprising using a normalization factor designed to maintain a constant area under said long tail demand curve.

16. The computer implemented method of claim 15, said normalization factor comprising:

$$f = \frac{S}{\sum_{n=1 to N} \mu_{k_n}}$$

where
- f comprises said normalization factor,
- $\mu_{k_n}$ comprises said corresponding preference score value for each element $k_n$ in said first window,
- S comprises said area under said long tail demand curve, and
- N comprises a number of objects in said first window.

17. The computer implemented method of claim 10, said calculating said corresponding first temporary preference score value comprising using an equation $$\mu_A^{Win} = \frac{1}{\#\{A\}} \sum_{\{A\}} the \mu_A$$

where
- $\mu_A^W$ comprises said corresponding first temporary preference score value in said first window W,
- $\{A\}$ comprises a set of objects within a specified distance from an object A in said first window W,
- $\mu_A$ comprises said corresponding known preference score value for element A in said first window W, and
- $\#\{A\}$ comprises a number of objects in said set $\{A\}$.

18. The computer implemented method of claim 10, said first window comprising more than ten objects.

19. The computer implemented method of claim 10, said first window comprising less than a thousand objects.

* * * * *